United States Patent Office 3,288,373
Patented Nov. 29, 1966

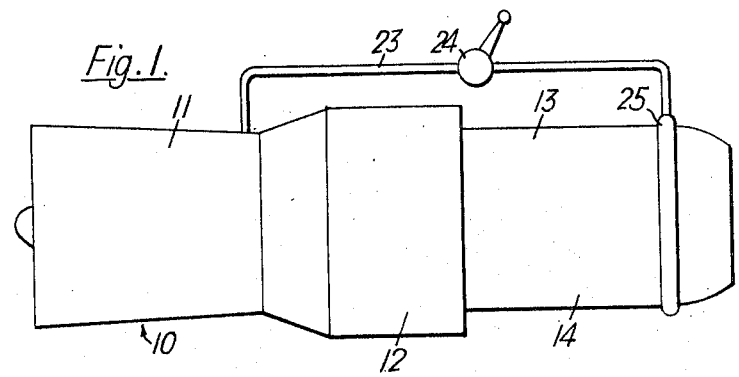
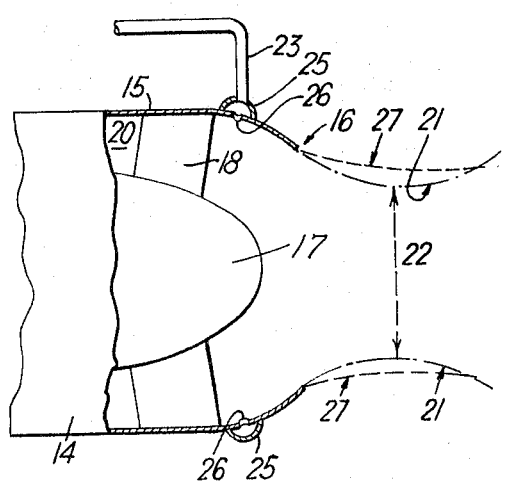
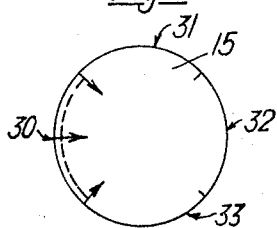
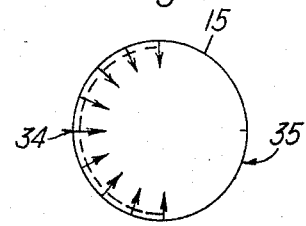
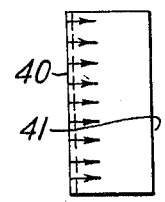

3,288,373
JET NOZZLE
Malcolm Roy Pike, Woodthorpe, England, assignor to Rolls-Royce Limited, Derby, England, a British company
Filed Apr. 12, 1965, Ser. No. 447,250
Claims priority, application Great Britain, June 18, 1964, 25,312/64
11 Claims. (Cl. 239—265.23)

This invention concerns jet nozzles and, although not so restricted, it will hereinafter be described with reference to its use as the final propulsion nozzle of a jet propulsion engine.

According to the present invention there is provided a jet nozzle through which fluid may flow to form a convergent-divergent jet the throat of which is downstream of the throat of said nozzle, and means for introducing further fluid into said jet upstream of the throat of said nozzle over a predetermined circumferential length thereof to thereby increase the area of the throat of said jet.

The nozzle may comprise a convergent annular casing which terminates at the throat of said nozzle.

Preferably said further fluid is introduced into the jet through slot(s) or apertures in the casing defining said nozzle. The slot(s) or apertures may extend over a predetermined circumferential length only of said casing. Alternatively they may extend around substantially the whole circumference of said casing, means being provided for empolying some only of said slot(s) or apertures over a predetermined circumferential length of said casing.

The nozzle may be circular in cross section, being provided with two or four sets of slots or apertures extending around the nozzle for one half or one quarter the circumferential length thereof respectively, means being provided for employing any one set.

Alternatively the nozzle may be rectangular in cross section, a slot or set of slots or apertures being provided on each of two opposing sides thereof, means being provided for using the slot or set on a preselected side of said nozzle.

Preferably the slot(s) or apertures communicate with at least one manifold through which said further fluid is supplied thereto.

The said further fluid may be introduced into the said jet at a point where the Mach number of the latter does not exceed 0.5 and where the static pressure is at least 85% of the total pressure.

The invention also includes a jet propulsion engine provided with a jet nozzle as set forth above, and an aircraft provided with such a jet propulsion engine mounted substantially vertically for providing direct vertical lift forces independent of any aerodynamic lift forces generated by flow of air over a member of aerofoil section.

The invention is illustrated, merely by way of example, in the accompanying diagrammatic drawings, in which:

FIGURE 1 is an elevation of a gas turbine jet propulsion engine according to the present invention, FIGURE 2 is a part sectional elevation of part of the engine of FIGURE 1, FIGURES 3 and 4 are end elevations of the engine of FIGURES 1 and 2 illustrating different modes of operation thereof, and FIGURE 5 is a view similar to FIGURES 3 and 4 of another embodiment of a jet nozzle according to the present invention.

Referring to the drawings, there is shown a gas turbine jet propulsion engine 10 comprising an axial flow compressor 11, combustion equipment 12, turbine 13 and jet pipe 14, all arranged in axial flow series. The jet pipe 14 comprises an external annular casing 15 which converges at its downstream end to form a jet propulsion nozzle 16. The nozzle 16 has its throat at the downstream end of the casing 15 i.e. at the point of minimum area.

The jet pipe 14 is also provided with a central exhaust cone 17 supported from the casing 15 by struts 18 and defining with casing 15 an annular exhaust duct 20 through which exhaust gases flow to atmosphere via the nozzle 16. Due to the form of the nozzle 16, the exhaust gases leaving the nozzle form a convergent-divergent jet 21 shown in dash-dot lines in FIGURE 2. The throat 22 of this jet is seen to be downstream of the throat of the nozzle 16.

A bleed duct 23 communicates with the downstream end of the compressor 11 and receives compressed air therefrom. This bleed air, controlled by a valve 24 in duct 23, flows to a manifold 25 disposed about the casing 15.

A series of equi-angularly spaced apart apertures 26 are provided in the casing 15 and communicate with the manifold 25, receiving air therefrom. The compressed air entering the duct 20 through the apertures 26 effectively reduces the convergence of the downstream end of the casing 15, thus reducing the effect the nozzle 16 has on the jet flowing therethrough. The jet is deflected to a smaller degree, and consequently the throat 22 is increased in area, the revised jet being indicated by broken line 27.

Thus the effective area of the nozzle 16 can be varied by varying the amount of air introduced into the jet through the apertures 26. This adjustment can be used to vary the nozzle area in accordance with power output of the engine. Thus the nozzle 16 could be designed to provide the optimum conditions for normal cruise conditions, air being introduced through the apertures 26 to increase the effective area of the nozzle 16 for take-off purposes, when power output is greater.

Referring to FIGURES 3 and 4 there are shown two possible arrangements for the apertures 26. In FIGURE 3, the apertures 26 are arranged in four equal sets 30, 31, 32, 33, each occupying one quarter the circumference of casing 15. Means (not shown) are provided for preventing air flowing from any selected set(s) of apertures. As shown, only set 30 is in operation. In this way, the jet exhausting through the nozzle 16 can be deflected in the general direction of the set of apertures in use.

As seen in FIGURE 4, the sets of apertures are arranged in two sets 34, 35 each occupying one half of the circumference of the casing 15. Means (not shown) are provided for selecting either or both sets for operation. Set 34 only is shown in use, the jet being deflected towards this set.

In FIGURE 5 there is shown an alternative form of nozzle which is rectangular in cross section. Sets of apertures are provided along opposite walls 40, 41 and means are provided for using either or both sets of apertures. As shown, the set along wall 40 is in use, thus deflecting the jet towards this set.

Thus the nozzle may be used to provide directional control of the jet flowing therethrough as well as providing means for varying the effective cross sectional area of the nozzle.

The nozzle is of particular use is vertical lift engines which are installed substantially vertically in aircraft to provide direct vertical lift independently of any aerodynamic lift generated by the flow of air over a member of aerofoil section.

This, using a nozzle such as that shown in FIGURE 3, lateral as well as fore and aft deflection of the jet may be achieved, and this may be useful for control purposes. The arrangements of FIGURES 4 and 5 may be used to provide fore and aft deflection, for example. The advantage of the FIGURE 5 arrangement over the similar FIGURE 4 arrangement is that greater deflection of the jet may be achieved using the rectangular form.

For best results, the air should be introduced into the duct 20 where the exhaust gases have large potential energy and low kinetic energy since in this condition the stream lines of the jet will be most affected for the minimum quantity of air bled from the compressor. Thus the air might be introduced into the duct 20 where the Mach number did not exceed 0.5 and at a point where the static pressure is at least 85% of the total pressure.

It will be appreciated that slots may be used instead of apertures, and that compressed air used in the manifold 25 (which is preferably at twice the pressure of the exhaust gases) need not be bled from the compressor 11 but could be obtained from a separate source of compressed air (e.g. an engine-driven blower).

The invention is not restricted to jet propulsion nozzles for engines, but may be applied to any jet nozzle where variation in effective area and/or directional control is required.

I claim:

1. A jet nozzle having a throat through which fluid may flow to form a convergent-divergent jet the throat of which is downstream of the throat of said nozzle, and means for introducing further fluid into said jet upstream of the throat of said nozzle over a predetermined circumferential length thereof to thereby increase the area of the throat of said jet.

2. A jet nozzle comprising a convergent annular casing a throat defined by said casing through which fluid may flow to form a convergent-divergent jet the throat of which is downstream of the throat of said nozzle, and means for introducing further fluid into said jet upstream of the throat of said nozzle over a predetermined circumferential length thereof to thereby increase the area of the throat of said jet.

3. A jet nozzle comprising a convergent annular casing a throat defined by said casing through which fluid may flow to form a convergent-divergent jet the throat of which is downstream of the throat of said nozzle, apertures in said casing upstream of said nozzle throat and means for introducing further fluid into said jet through said apertures and over a predetermined circumferential length of said nozzle to thereby increase the area of the throat of said jet.

4. A jet nozzle comprising a convergent annular casing a throat defined by said casting through which fluid may flow to form a convergent-divergent jet the throat of which is downstream of the throat of said nozzle, apertures in said casing upstream of said nozzle throat extending over a predetermined circumferential length only of said casing, and means for introducing further fluid into said jet through said apertures to thereby increase the area of the throat of said jet.

5. A jet nozzle comprising a convergent annular casing, a throat defined by said casing through which fluid may flow to form a convergent-divergent jet the throat of which is downstream of the throat of said nozzle, apertures in said casing upstream of said nozzle throat extending around substantially the whole circumference of said casing, and means for introducing further fluid into said jet through selected ones only of said apertures over a predetermined circumferential length of said nozzle to thereby increase the area of the throat of said jet.

6. A jet nozzle comprising a convergent annular casing, a throat defined by said casing through which fluid may flow to form a convergent-divergent jet the throat of which is downstream of the throat of said nozzle, two sets of apertures in said casing upstream of said nozzle throat each set extending around the nozzle for one half the circumferential length thereof, and means for introducing further fluid into said jet through one of said sets of apertures to thereby increase the area of the throat of said jet.

7. A jet nozzle comprising a convergent annular casing, a throat defined by said casing through which fluid may flow to form a convergent-divergent jet the throat of which is downstream of the throat of said nozzle, four sets of apertures in said casing upstream of said nozzle throat each set extending around the nozzle for one quarter the circumferential length thereof, and means for introducing further fluid into said jet through at least one of said sets of apertures to thereby increase the area of the throat of said jet 8. A jet nozzle comprising a convergent annular casing, a throat defined by said casing through which fluid may flow to form a convergent-divergent jet the throat of which is downstream of the throat of said nozzle, apertures in said casing upstream of said nozzle throat, a manifold around the casing communicating with said apertures, and means for introducing further fluid through said manifold and into said jet over a predetermined circumferential length of said nozzle to thereby increase the area of the throat of said jet.

9. A jet nozzle having a throat through which fluid may flow to form a convergent-divergent jet the throat of which is downstream of the throat of said nozzle, and means for introducing further fluid into said jet upstream of the throat of said nozzle over a predetermined circumferential length thereof at a point where the Mach number of the jet does not exceed 0.5 and where the static pressure is at least 85% of the total pressure to thereby increase the area of the throat of said jet.

10. In a jet propulsion engine a jet nozzle having a throat through which fluid may flow to form a convergent-divergent jet the throat of which is downstream of the throat of said nozzle, and means for introducing further fluid into said jet upstream of the throat of said nozzle over a predetermined circumferential length thereof to thereby increase the area of the throat of said jet.

11. In an aircraft a substantially vertically disposed jet propulsion engine for providing direct vertical lift forces independent of any aerodynamic lift forces generated by flow of air over a member of aerofoil section, said engine baing provided with a jet nozzle having a throat through which fluid may flow to form a convergent-divergent jet the throat of which is downstream of the throat of said nozzle, and means for introducing further fluid into said jet upstream of the throat of said nozzle over a predetermined circumferential length thereof to thereby increase the area of the throat of said jet.

References Cited by the Examiner

UNITED STATES PATENTS

| 2,763,984 | 9/1956 | Kadosch et al. | 60—35.6 |
| 2,943,821 | 7/1960 | Wetherbee | 244—52 |
| 3,016,699 | 1/1962 | Bertin et al. | 60—35.54 |
| 3,024,602 | 3/1962 | Bertin et al. | 60—25.54 |

CARLTON R. CROYLE, *Primary Examiner.*